(12) United States Patent
Maharana et al.

(10) Patent No.: US 7,788,420 B2
(45) Date of Patent: Aug. 31, 2010

(54) ADDRESS BUFFER MODE SWITCHING FOR VARYING REQUEST SIZES

(75) Inventors: Parag R. Maharana, Fremont, CA (US); Senthil M. Thangaraj, Fremont, CA (US); Gerald E. Smith, Suwanee, GA (US)

(73) Assignee: LSI Corporation, Milpitas, CA (US)

( * ) Notice: Subject to any disclaimer, the term of this patent is extended or adjusted under 35 U.S.C. 154(b) by 308 days.

(21) Appl. No.: 11/232,927

(22) Filed: Sep. 22, 2005

(65) Prior Publication Data

US 2007/0067501 A1 Mar. 22, 2007

(51) Int. Cl.
*G06F 3/00* (2006.01)
*G06F 12/00* (2006.01)

(52) U.S. Cl. .......... 710/14; 710/3; 710/4; 710/62; 710/72; 710/74; 710/100; 711/114; 711/200; 711/211; 711/212

(58) Field of Classification Search .......... 710/14
See application file for complete search history.

(56) References Cited

U.S. PATENT DOCUMENTS

| | | | | |
|---|---|---|---|---|
| 5,249,279 A * | 9/1993 | Schmenk et al. | ............. | 710/5 |
| 5,640,600 A * | 6/1997 | Satoh et al. | ............. | 710/33 |
| 5,680,598 A * | 10/1997 | Farrell et al. | ............. | 712/227 |
| 5,682,509 A * | 10/1997 | Kabenjian | ............. | 710/312 |
| 5,764,938 A * | 6/1998 | White et al. | ............. | 712/200 |
| 5,826,074 A * | 10/1998 | Blomgren | ............. | 712/234 |
| 5,828,865 A * | 10/1998 | Bell | ............. | 703/27 |
| 5,867,645 A * | 2/1999 | Olarig | ............. | 714/48 |
| 5,913,045 A * | 6/1999 | Gillespie et al. | ............. | 710/311 |
| 6,047,120 A * | 4/2000 | Bell | ............. | 703/27 |
| 6,047,348 A * | 4/2000 | Lentz et al. | ............. | 710/307 |
| 6,175,884 B1 * | 1/2001 | Harriman et al. | ............. | 710/30 |
| 6,179,664 B1 * | 1/2001 | Tung et al. | ............. | 439/633 |
| 6,189,058 B1 * | 2/2001 | Jones et al. | ............. | 710/302 |
| 6,260,137 B1 * | 7/2001 | Fleck et al. | ............. | 712/225 |
| 6,266,755 B1 * | 7/2001 | Yeager | ............. | 711/210 |
| 6,266,778 B1 * | 7/2001 | Bell | ............. | 713/400 |
| 6,381,674 B2 * | 4/2002 | DeKoning et al. | ............. | 711/113 |
| 6,609,163 B1 * | 8/2003 | Nguyen et al. | ............. | 710/21 |

(Continued)

FOREIGN PATENT DOCUMENTS

JP 10214250 A * 8/1998

(Continued)

OTHER PUBLICATIONS

IBM Technical Disclosure NN9512485.*

(Continued)

*Primary Examiner*—Henry W. H. Tsai
*Assistant Examiner*—Steven G Snyder
(74) *Attorney, Agent, or Firm*—Cochran Freund & Young LLC

(57) ABSTRACT

A plurality of modes is provided for communicating between a host system and a peripheral storage system controller. A first communication mode may be selected from the plurality of communication modes based on a bit length required to communicate a physical address. During runtime, a switch from the first communication mode to a second communication mode may be performed in order to improve the efficiency of processing address requests at the storage system controller.

20 Claims, 4 Drawing Sheets

U.S. PATENT DOCUMENTS

| | | | |
|---|---|---|---|
| 7,058,791 B1 * | 6/2006 | Hughes et al. | 712/43 |
| 2003/0086324 A1 * | 5/2003 | Higashiho | 365/222 |
| 2003/0196077 A1 * | 10/2003 | Henry et al. | 712/245 |
| 2003/0221038 A1 * | 11/2003 | Yoo et al. | 710/305 |
| 2005/0044290 A1 * | 2/2005 | Ishii | 710/33 |
| 2007/0028075 A1 * | 2/2007 | Holder et al. | 711/210 |

FOREIGN PATENT DOCUMENTS

| | | | |
|---|---|---|---|
| JP | 2000020458 A | * | 1/2000 |
| JP | 2000204061 A | * | 7/2000 |
| JP | 2003281087 A | * | 10/2003 |

OTHER PUBLICATIONS

IBM Technical Disclosure NN960839.*

* cited by examiner

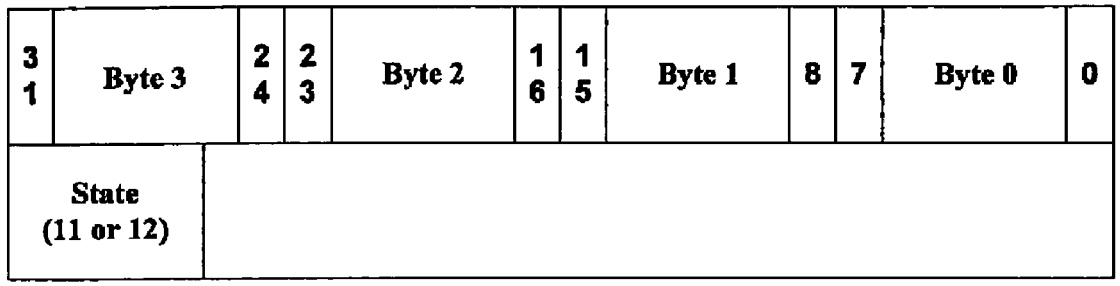

Figure 3A

| State | Name | Description |
|---|---|---|
| 0 | MFI_State_UNDEFINED | The firmware has not started initialization |
| 1 | MFI_STATE_BB_INIT | The firmware low-level initialization code is executing |
| 4 | MFI_STATE_INIT | The firmware has been loaded into memory and is initializing |
| 6 | MFI_STATE_WAIT_HAND SHAKE | The firmware is waiting for a handshake from BIOS or device driver before continuing initialization |
| 8 | MFI_STATE_DEVICE_SC AN | The firmware is scanning and initializing attached devices |
| 11 | MFI_STATE_READY | The firmware has completed initialization, but the response queue has not been initialized |
| 12 | MFI_STATE_OPERATION AL | The firmware and response queue have initialized |
| 15 | MFI_STATE_FAULT | The firmware has hit a fault condition |

Figure 3B

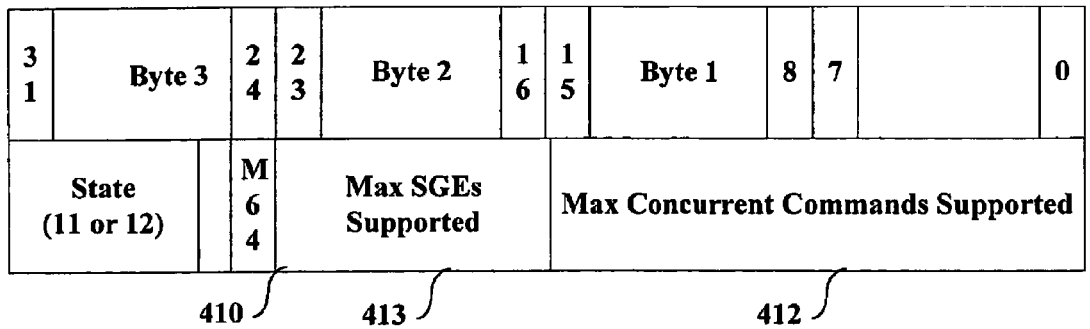
Figure 4A
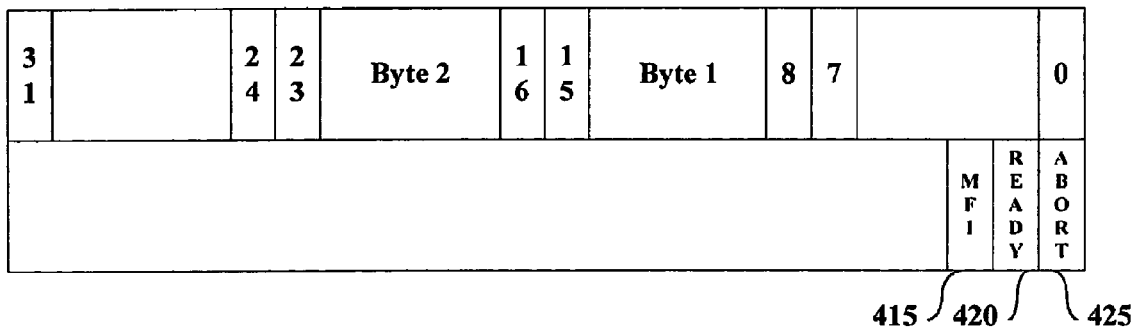
Figure 4B
| State | Name | Description |
|---|---|---|
| 0 | ABORT | Abort All Pending Commands |
| 1 | READY | Transition from OPERATIONAL to READY state. |
| 2 | MFI MODE | Discard (Possible) Low MFA Posted in 64-Bit Mode |
Figure 4C

ADDRESS BUFFER MODE SWITCHING FOR VARYING REQUEST SIZES

RELATED APPLICATIONS

This application is related to U.S. Patent Application entitled "Variable Length Command Pull with Contiguous Sequential Layout," Ser. No. 11/070,131, filed on Mar. 1, 2005, which is incorporated by reference in their entirety.

BACKGROUND

A. Technical Field

The present invention relates to the communication of storage request commands, and more particularly, to providing a plurality of communication modes in which variable request size commands are communicated between a controller and a host system.

B. Background of the Invention

A host processor or device driver communicates with various peripheral devices to control the operation of these devices within the processor's system. One such example is a processor communicating with a memory device, such as a redundant array of independent disks ("RAID"), via a PCI Bus. A controller within the RAID may receive a request, such as a read/write command, from an operating system and perform a corresponding action on one or more drives within the RAID. Typically, this communication between the operating system and memory device occurs in fixed length words that are defined within the system so that both operating system and the controller communicate properly.

One such example is the use of a 32-bit word, sent during a single input/output cycle, in which an address may be provided relating to a particular request. This particular example presents a problem if the system memory size requires a word that is longer than 32-bit in order to communicate a physical address. This problem is currently addressed by effectively patching a longer address within the 32-bit word using standard coding techniques. The encoded address is sent to the controller, which must extract the address using decoding techniques.

This method of communicating coded addresses within a 32-bit word still limits the maximum addressable memory due to the limited amount of information that can be stored in 32-bits. Another common solution is to simply increase the size of the passed address to 64-bits. This option allows addressability of the full address space of today's computer systems, but has the disadvantage or requiring two 32-bit 10 cycles in order to communicate the 64-bit address. The primary disadvantage with this approach is that it effectively requires multiple cycles in order to communicate the address to the controller. In particular, the process requires double buffering within a 32-bit address buffer, reading this buffer, and extracting the actual address. This overhead occurs for all addresses, even those that do not require 64-bit addressing. The process introduces inefficiencies within the fetching operations and causes delay in the performance of requests.

Accordingly it is desirable to provide a device and method that addresses the above-described problems.

SUMMARY OF THE INVENTION

A system, apparatus and method are provided for defining a plurality of modes for communicating variable size requests between a host system and a peripheral storage system controller. A first communication mode may be selected from the plurality of communication modes based on a size of memory and the bit length required to communicate a physical address associated with the memory. During runtime, a switch from the first communication mode to a second communication mode also may be performed in order to improve the efficiency of processing address requests at the storage system controller.

In one embodiment of the invention, a RAID controller and driver communicate in accordance with one mode selected from a plurality of available communication modes in order to improve the processing of an address request. A 32-bit mode and a 64-bit mode may be available and one mode is selected according to the length of the physical address of a message frame. For example, if the physical address is less than a threshold size then a 32-bit mode is used and if the address is larger than a threshold size then a 64-bit mode is used. The availability of these modes allows a system to more efficiently process varying address request sizes by reducing the number of I/O cycles required to process the address request.

A mode may be established through a handshake between the controller and the driver. In one embodiment, this handshake may occur at the time of initialization during which a particular mode is identified in which communication between the controller and driver is to occur. In another embodiment, a mode may be changed during runtime, which would require that there not be any pending commands and that a handshake between the devices occurs prior to switching the mode.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 3A is an illustration of format of firmware state register according to one embodiment of the present invention.

FIG. 3B is an illustration of table listing the pre-defined firmware states and their description according to one embodiment of the invention.

FIG. 4A is an illustration of table for maximum concurrent commands and SCSI generic entries according to one embodiment of the invention.

FIG. 4B is an illustration of format of firmware command reset register according to one embodiment of the invention.

FIG. 4C is an illustration of table listing the operations performed on firmware to reset to original state according to one embodiment of the invention.

DETAILED DESCRIPTION OF THE PREFERRED EMBODIMENTS

An apparatus and method for providing and switching between different communication modes is described. In one embodiment of the invention, a RAID controller and driver communicate in accordance with one mode within a plurality of available communication modes in order to improve the processing of an address request. A 32-bit mode and a 64-bit mode may be available and one mode is selected according to the length of the physical address of a message frame. For example, if the physical address is less than 4 gigabits then a 32-bit mode is used and if the address is larger than 4 gigabits then a 64-bit mode is used. The availability of these modes allows a system to more efficiently process varying address request sizes by reducing the number of I/O cycles required to process the address request.

A mode may be established through a handshake between the controller and the driver. In one embodiment, this handshake may occur at the time of initialization during which a particular mode is identified in which communication between the controller and driver is to occur. In another embodiment, a mode may be changed during runtime, which would require that there not be any pending commands and that a handshake between the devices occurs prior to switching the mode.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including personal computers, storage devices and network servers. The embodiments of the present invention may also be present in software, hardware or firmware. Structures and devices shown below in block diagram are illustrative of exemplary embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

C. Overview

Figure 1:
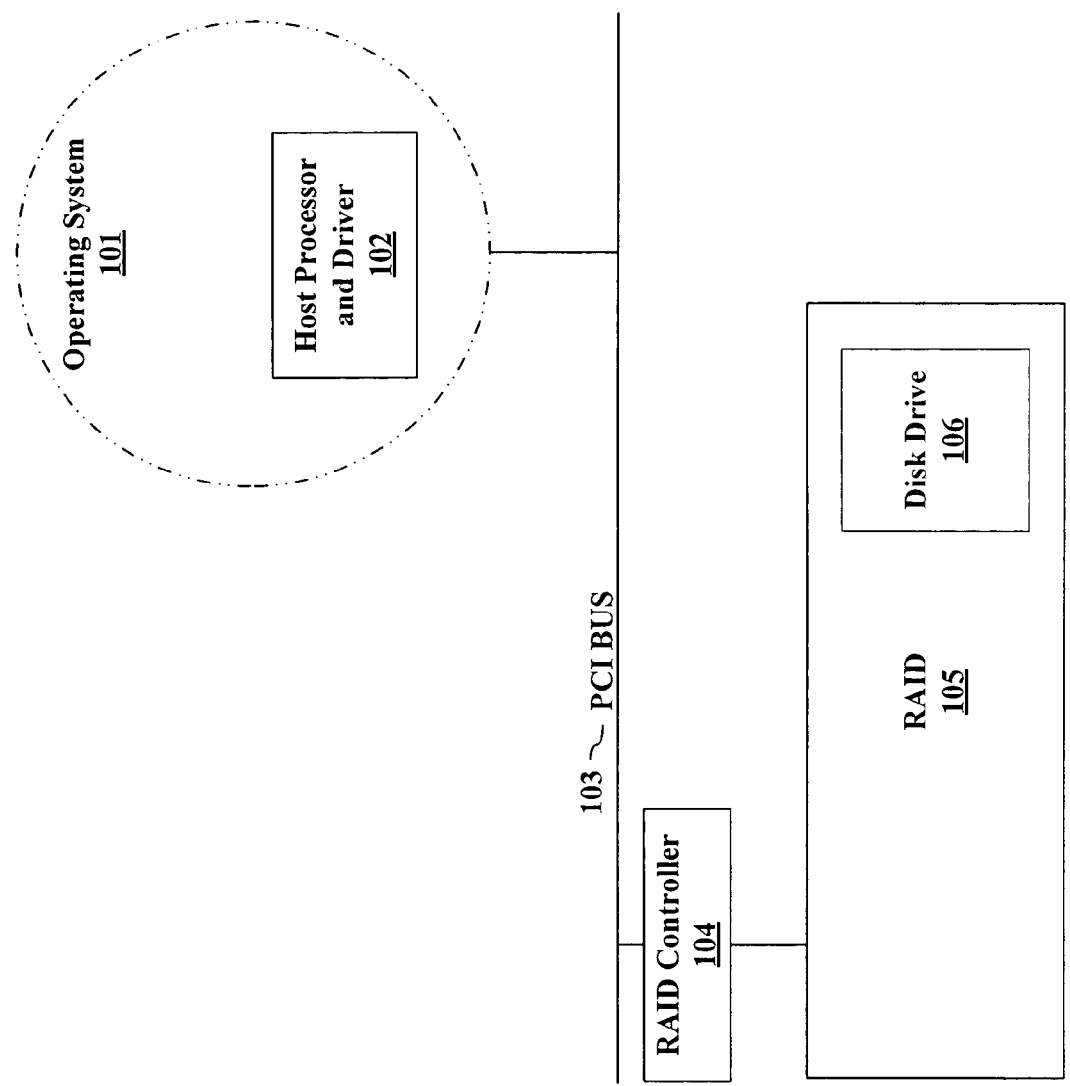
FIG. 1 is diagrammatic view of an interface between a firmware controller and a system processor over a PCI Bus according to one embodiment of the invention.

FIG. 1 is an illustration of a host system and attached RAID. The host system may comprise an operating system 101 and host processor and/or driver 102 that communicates with a RAID controller 104 via PCI bus 103. This communication may include requests, such as read/write operations, to the RAID 105, which contains a plurality of disk drives, including disk drive 106.

According to one embodiment of the invention, communication between the processor/driver 102 and controller 104 occurs in accordance with a mode of communication. This mode defines the parameters in which the processor/driver 102 and controller 104 communicate including the length of an address buffer in which the processor/driver provide a physical address of a message frame. By adjusting the length of the address buffer, the processing of I/O commands may be improved through matching buffer length to address length.

In one embodiment of the invention, a first mode having a 32-bit address buffer is defined and a second mode having a 64-bit address buffer is defined. Accordingly, if a system has a memory above a particular threshold that would require an address length not suited for a 32-bit buffer, the system may switch to the second mode and write the address within an effect 64-bit address buffer. This switching between modes allows a system to effectively address memories of varying sizes while reducing the number of cycles required to process a particular address request.

D. RAID Controller

Communication between the host processor 102 and controller 104 may include the use of one or more registers. These registers may include message registers, doorbell registers, and interrupt registers. The processor 102 may put a command in an inbound post queue (e.g., circular queue) after preparing a message frame in the host memory. If a physical address allotted to this message frame is greater than a particular value (e.g. 4 GB) then two address cycles are needed to send this frame to the controller 104. The use of two address cycles for a single command is called as Dual Addressing Scheme ("DAS").

Figure 2:
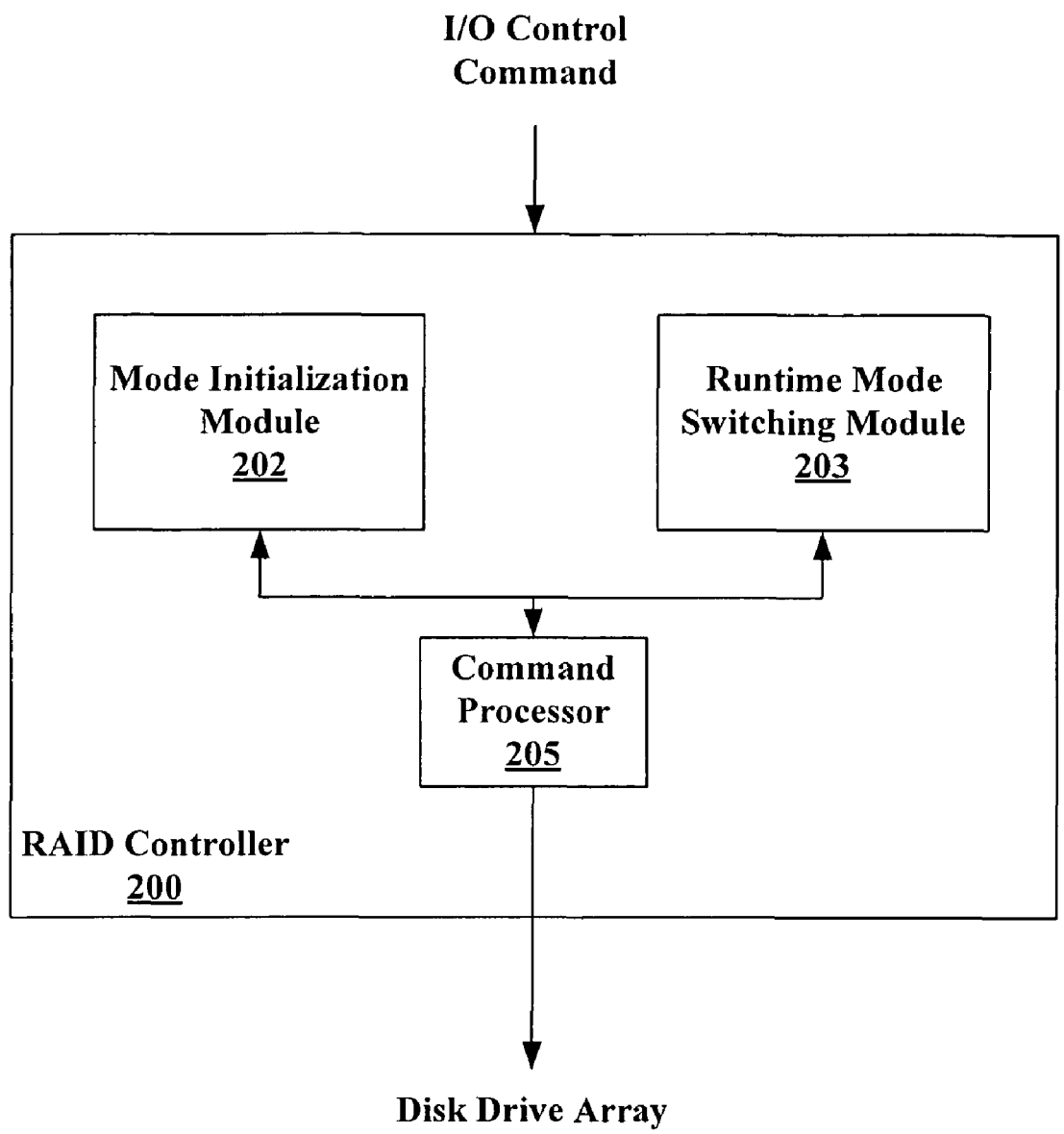
FIG. 2 is a block diagram of a RAID controller according to one embodiment of the invention.

FIG. 2 illustrates an embodiment of a RAID controller according to one embodiment of the invention. In this embodiment, the RAID controller 200 comprises a mode initialization module 202, a runtime mode switching module 203 and a command processor 205. The RAID controller 200 receives commands from an operating system including address information related to various requests from an operating system. The command processor 205 receives these commands and may interface with either the mode initialization module 202 or the runtime mode switching module 203 to ensure that the controller 200 is operating in the appropriate mode.

The RAID controller 200 and driver operate in one of a plurality of available modes. The mode initialization module 202 effectively controls the mode in which the RAID controller receives commands after initialization. In one embodiment, a host processor or driver may place a command in a queue at initialization that identifies a mode in which physical addresses are to be provided to the controller 200. During or after the RAID controller 200 is initialized, the mode initialization module 202 checks this queue to determine the appropriate mode of communication. The controller 200 will operate in this mode until it is notified of a mode switch during runtime or re-initialization.

In one embodiment of the invention, a communication mode between the RAID controller 203 and a driver or processor may be switched during runtime. In this embodiment, the runtime mode switching module 203 is signaled by a driver or processor that it is switching modes. In another embodiment, the runtime mode switching module 203 determines that a mode switch is appropriate and signals the driver or processor. In either embodiment, it is important that there are not any pending commands prior to the actual switching of a mode. For example, once a dual addressing scheme is enabled, a driver may write a particular bit in an inbound queue port for switching back to a single address scheme.

In one embodiment of the invention, a single address scheme is set as a default when the controller 203 boots up. If the physical address of the message frame is less than a particular value (e.g., 4 GB), then it may be right shifted a certain number of bits, such as 3 bits for making the driver/agent specify the number of frames to be read. If the physical address of the message frame is greater than a particular value (e.g., 4 GB), then the number of frames to be read is specified in a lower address.

FIG. 3A is an illustration of a format for a controller firmware state register according to one embodiment of the invention. As described above, the status of the controller 200 may be posted to an outbound message register and a device driver checks this register, before sending any commands. A driver may reset the modes in the controller 200 by writing to an inbound message register. According to one embodiment of the invention, the firmware state register is a 32-bit register containing the firmware state in its four Most Significant Bits (MSB) and state specific data in its remaining 28 bits.

FIG. 3B is an exemplary table listing pre-defined controller firmware states and their description according to one embodiment of the invention. As shown in this table, if the firmware state is in MFI_STATE_READY (11) or MFI_STATE_OPERATIONAL (12) the driver may send commands. In one particular embodiment of the invention, the firmware state is determined by reading the above-described four MSB of an outbound message register. If the state is less than MFI_STATE_READY (11), the driver waits until the firmware state becomes MFI_STATE_READY (11) before sending any commands.

If firmware state is MFI_STATE_FAULT (15), then it indicates that an internal firmware/hardware fault has occurred and the driver should not load any further commands. Further, whenever any fault occurs, the driver posts an operating system event indicating the fault condition of the controller 200. If firmware state is MFI_STATE_READY (11) or MFI_STATE_OPERATIONAL (12), then controller 200 posts the maximum possible number of outstanding commands, and the maximum possible number of scatter/gather elements ("SGE") for any one command in the MFI_STATE register.

FIG. 4A is an illustration of table, according to one embodiment of the invention, listing the maximum concurrent commands and Scatter/Gather Entries ("SGEs") as explained in relation to FIG. 3B. According to one embodiment of the invention, an "M64" field 410 indicates that a 64-bit mode is currently enabled by setting the bit within the field as 1 or disabled by setting the "M64" field as 0. Once enabled, all incoming firmware addresses ("FAs") are issued as 64-bit frame pointer, and all contexts are returned as 64-bits, else, all FAs are issued as 32-bit and contexts are returned as 32-bits. During firmware initialization, a driver may clear all pending commands and set a new state using an inbound message register. The lower two bytes 412 may contain the maximum concurrent commands supported. Bits 16-23 413 indicate the maximum SGE supported and the four MSB contain the Firmware state as explained in relation to FIG. 3A.

FIG. 4B is an illustration of a format for a controller firmware command reset register according to one embodiment of the invention. According to this embodiment, the firmware may reset to an original state whenever it receives Abort 415, Ready 420 or MegaRAID Firmware Initialize ("MFI") Mode 425 commands. In one embodiment, the firmware command reset register contains the reset states in its lower most byte. All other bytes of this register may be reserved for other applications.

FIG. 4C is an illustration of table listing the operations performed on controller firmware to reset to original state according to one embodiment of the invention. In this embodiment, the state of the Abort operation is set as 0 and Ready Mode is set as 1, in which the firmware 103 transits from OPERATIONAL state (12) to Ready State (11) and the queue information is discarded. The MFI mode may be set as 2, the low MFA posted in 64-bit mode is discarded.

The above description is included to illustrate the operation of the preferred embodiments and is not meant to limit the scope of the invention. From the above description, many variations will be apparent to one skilled in the art that would yet be encompassed in the spirit and scope of the invention. Accordingly, the scope of the invention is to be limited only by the following claims.

We claim:

1. A storage controller that communicates with a host system, said storage controller comprising:
    a bus interface, coupled to a bus, on which commands from said host system are received;
    a command processor, communicatively coupled to said bus interface, that processes said commands from said host system;
    a communication mode initialization module, coupled to receive a communication mode initialization command from said host system, that sets a first communication address buffer length mode of said storage controller from a plurality of available communication address buffer length modes;
    a runtime communication mode switching module, coupled to said communication mode initialization module, that switches from said first communication address buffer length mode to a second communication address buffer length mode during runtime based on an address length of a memory address command such that said second communication address buffer length mode aligns an address buffer length of said storage controller with said address length of said memory address command, and does not manipulate individual bits to accommodate said changes in address length of said memory address command, said address length of said memory address command being a number of bits within said memory address command.

2. The storage controller of claim 1 wherein said storage controller controls a Redundant Array of Independent Disks.

3. The storage controller of claim 1 wherein said communication mode initialization module initiates a communication address buffer length mode in response to said host system writing a command in a queue.

4. The storage controller of claim 1 wherein said communication mode initialization module initiates a particular default communication address buffer length mode at initialization of said storage controller.

5. The storage controller of claim 1 wherein said first communication address buffer length mode defines a 32-bit word in an address buffer.

6. The storage controller of claim 1 wherein said first communication address buffer length mode defines a 64-bit word in an address buffer.

7. The storage controller of claim 1 wherein said second communication address buffer length mode defines a 64-bit word in an address buffer.

8. A method for establishing a communication mode between a storage controller and a host system, said method comprising:
    identifying a first bit length required to provide a physical address to a said storage controller;
    selecting a first communication address buffer length mode from a plurality of communication address buffer length modes, based on said identified first bit length such that said first communication address buffer length mode aligns an address buffer length of said storage controller with said identified first bit length; and
    switching at runtime from said first communication address buffer length mode to a second communication address buffer length mode based on a second bit length within a memory address command such that said second communication address buffer length mode aligns said address buffer length of said storage controller with said second bit length and does not manipulate individual bits to accommodate said changes in address length of said memory address command.

9. The method of claim 8 wherein said first communication address buffer length mode is established at initialization of said storage controller.

10. The method of claim 8 wherein said storage controller controls a Redundant Array of Independent Disks.

11. The method of claim 8 further comprising a step of said host system writing a command in a command queue to notify said storage controller of said selected first communication address buffer length mode.

12. The method of claim 11 wherein a driver for a storage system associated with said storage controller writes said command in said command queue.

13. The method of claim 8 wherein said first communication address buffer length mode defines a 32-bit length address buffer.

14. The method of claim 8 wherein said second communication address buffer length mode defines a 64-bit length address buffer.

15. A computer program product embodied on a non-transitory computer readable medium for establishing a communication address buffer length mode between a storage controller and a host system, said computer program product comprising computer instructions for:

identifying a first bit length required to provide a physical address to said storage controller;

selecting a first communication address buffer length mode from a plurality of communication address buffer length modes, based on said identified first bit length such that said first communication address buffer length mode aligns an address buffer length of said storage controller with said identified first bit length; and switching at runtime from said first communication address buffer length mode to a second communication address buffer length mode based on a second bit length within a memory address command such that said second communication address buffer length mode aligns said address buffer length of said storage controller with said second bit length and does not manipulate individual bits to accommodate said changes in address length of said memory address command.

16. The computer program product of claim 15 wherein said first communication address buffer length mode defines a 32-bit address buffer.

17. The computer program product of claim 15 wherein said second communication address buffer length mode defines a 64-bit length address buffer.

18. The storage controller of claim 1 wherein said runtime communication mode switching module ensures that there are no pending commands prior to switching from said first communication address buffer length mode to said second communication address buffer length mode.

19. The method of claim 8 further comprising a step for ensuring that there are no pending commands prior to switching from said first communication address buffer length mode to said second communication address buffer length mode.

20. The computer program product of claim 15 further comprising computer instructions for ensuring that there are no pending commands prior to switching from said first communication address buffer length mode to said second communication address buffer length mode.

* * * * *